US011034838B2

(12) United States Patent
Mayes et al.

(10) Patent No.: US 11,034,838 B2
(45) Date of Patent: Jun. 15, 2021

(54) COMPOSITE MATERIAL AND COMPOSITE PRODUCT

(71) Applicants: Stora Enso OYJ, Helsinki (FI); University of Maine System Board of Trustees, Bangor, ME (US)

(72) Inventors: Duncan Mayes, Helsinki (FI); Janne Pynnonen, Lempaala (FI); Christopher H. West, Detroit, ME (US); Douglas J. Gardner, Brewer, ME (US); Yousoo Han, Bangor, ME (US)

(73) Assignees: Stora Enso OYJ, Helsinki (FI); University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 16/483,149

(22) PCT Filed: Feb. 1, 2018

(86) PCT No.: PCT/IB2018/050622
§ 371 (c)(1),
(2) Date: Aug. 2, 2019

(87) PCT Pub. No.: WO2018/142314
PCT Pub. Date: Aug. 9, 2018

(65) Prior Publication Data
US 2020/0239690 A1 Jul. 30, 2020

Related U.S. Application Data
(60) Provisional application No. 62/454,110, filed on Feb. 3, 2017.

(51) Int. Cl.
*C08L 97/02* (2006.01)
*B27K 5/00* (2006.01)
*B27N 1/02* (2006.01)
*B27N 3/00* (2006.01)
*C08L 25/08* (2006.01)
*B27N 3/28* (2006.01)

(52) U.S. Cl.
CPC ............ *C08L 97/02* (2013.01); *B27K 5/0085* (2013.01); *B27N 1/02* (2013.01); *B27N 3/002* (2013.01); *C08L 25/08* (2013.01); *B27K 2200/10* (2013.01); *B27K 2200/15* (2013.01); *B27N 3/28* (2013.01); *C08L 2205/025* (2013.01); *C08L 2205/03* (2013.01)

(58) Field of Classification Search
CPC ....... C08L 97/02; C08L 25/08; B27K 5/0085; B27K 2200/10; B27K 2200/15; B27N 1/02; B27N 3/28; B27N 3/002
USPC .......................................................... 524/13
See application file for complete search history.

(56) References Cited

U.S. PATENT DOCUMENTS

| | | | |
|---|---|---|---|
| 3,765,934 A | 10/1973 | Gaylord | |
| 3,894,975 A | 7/1975 | Gaylord | |
| 3,908,902 A | 9/1975 | Collins et al. | |
| 3,958,069 A | 5/1976 | Gaylord | |
| 4,091,153 A | 5/1978 | Holman | |
| 4,686,251 A | 8/1987 | Ostermann et al. | |
| 4,708,623 A | 11/1987 | Aoki et al. | |
| 5,002,713 A | 3/1991 | Palardy et al. | |
| 5,087,400 A | 2/1992 | Theuveny | |
| 5,100,109 A | 3/1992 | Robbins | |
| 5,151,238 A | 9/1992 | Earl et al. | |
| 5,404,685 A | 4/1995 | Collins | |
| 5,417,904 A | 5/1995 | Razi et al. | |
| 5,948,524 A | 9/1999 | Seethamraju et al. | |
| 6,280,667 B1 | 8/2001 | Koenig et al. | |
| 6,827,995 B2 | 12/2004 | Hughes et al. | |
| 6,908,995 B2 * | 6/2005 | Blount | C08H 8/00 536/123 |
| 6,936,200 B2 | 8/2005 | Park et al. | |
| 8,221,663 B2 | 7/2012 | Michalik et al. | |
| 2008/0286551 A1 * | 11/2008 | Michalik | B29B 9/16 428/220 |
| 2012/0172494 A1 | 7/2012 | Warnes et al. | |

FOREIGN PATENT DOCUMENTS

| | | |
|---|---|---|
| CA | 2626992 A1 | 5/2007 |
| CN | 1513651 A | 7/2004 |
| CN | 101747644 A | 6/2010 |
| CN | 101864118 A | 10/2010 |
| CN | 102470544 A | 5/2012 |
| FR | 2609927 A1 | 7/1988 |

OTHER PUBLICATIONS

"Properties of Styrene-Maleic Anhydride Copolymers Containing Wood-Based Fillers", Simonsen et al., Forest Products Journal, vol. 48, No. 1, pp. 89-92, Jan. 1998.
International Searching Authority, International Search Report, PCT/IB2018/050622, dated May 5, 2018.
Yang, Li et al. "Landscape materials and Applications" Shanghai Jiaotong University Press, Dec. 2013, pp. 78-79.
Chinese Office Action for Chinese Patent application No. 201880008947.3 dated Jun. 2, 2020.

* cited by examiner

*Primary Examiner* — Hui H Chin
(74) *Attorney, Agent, or Firm* — Greer, Burns & Crain, Ltd.

(57) ABSTRACT

The present invention is directed to a composite material comprising a cellulosic material, high impact polystyrene (HIPS) and styrene maleic anhydride (SMA). The cellulosic material may be thermally modified prior to being incorporated into the composite material. The present invention is also directed to a composite product that comprises the composite material according to the invention.

14 Claims, No Drawings

COMPOSITE MATERIAL AND COMPOSITE PRODUCT

This application is a U.S. National Phase under 35 U.S.C. § 371 of International Application No. PCT/IB2018/050622, filed Feb. 1, 2018, which claims priority under 35 U.S.C. §§ 119 and 365 to U.S. Provisional Application No. 62/454,110, filed Feb. 3, 2017.

FIELD OF THE INVENTION

The present invention is directed to a composite material comprising a cellulosic material, high impact polystyrene (HIPS) and styrene maleic anhydride (SMA). The cellulosic material may be thermally modified prior to being incorporated into the composite material. The present invention is also directed to a composite product that comprises the composite material according to the invention.

BACKGROUND

Traditionally, fences, decks, doors, windows, cladding and siding are made of components fashioned from solid wood. These products are often considered more aesthetically appealing than those made of metal or cement, for example, metal fences or cement block walls or decks. However, after a period of time, solid wood products may naturally begin to break down from weather exposure and biological infestations. It is known that this deterioration can be tempered by treating the wood with widely available weather resistant coatings, paints, varnishes, finishes and the like. Unfortunately, however, treated wood products can often deteriorate within a short period of time requiring partial or complete replacement. Maintenance of many solid wood materials that are suitable for fencing, decking, windows and doors is costly. In addition, because of natural variations in wood, replacement of individual components may result in an inconsistent, uneven appearance to the products.

Many products, technologies and ideas are used to make extruded or molded thermoplastics as an alternative to wood in semi-structural outdoor applications such as decking, park walkways, children's playgrounds, seats and benches. The thermoplastic most widely used is polyethylene, typically a recycled product from HDPE, LDPE & LLDPE milk bottles, film etc. Other thermoplastics widely used include polystyrene, impact modified polystyrene, PVC and polypropylene. Many systems also use inorganic fillers such as calcium carbonate, and talc or cellulosic filler, typically wood or other natural fibers, compounded into the thermoplastic to enhance properties and make the compound look more like the wooden lumber it replaces. These systems are rapidly gaining market acceptance, especially in decks where they have advantages of long-term durability and reduced maintenance. They have an additional advantage because of recent health concerns regarding the chemicals and preservatives used to treat wood for outdoor applications and in view of the scarcity of durable hardwoods.

Many composites, such as cellulosic/polymer composites are used as replacements for all-natural wood, particleboard, wafer board, and other similar material. For example, U.S. Pat. Nos. 3,908,902; 4,091,153; 4,686,251; 4,708,623; 5,002,713; 5,087,400; 5,151,238; 5,417,904; 5,948,524; 6,280,667; 6,827,995 and 6,936,200 relate to processes for making plastic/cellulose wood replacement products.

Solid composites of styrene-maleic anhydride and wood-based fillers are disclosed in U.S. Pat. Nos. 3,765,934; 3,894,975 and 3,958,069; Canadian Published Patent Application No. 2,626,992 A1 and "Properties of Styrene-Maleic Anhydride Copolymers Containing Wood-Based Fillers", Simonsen et al., Forest Products Journal, Vol. 48, No. 1, pp. 89-92, January, 1998.

As compared to natural woods, cellulosic/polymer composites offer superior resistance to wear and tear. In particular, cellulosic/polymer composites have enhanced resistance to moisture. In fact, it is well known that the retention of moisture is a primary cause of the warping, splintering, and discoloration of natural woods. Moreover, cellulosic/polymer composites have the appearance of natural wood, and they may be sawn, sanded, shaped, turned, fastened, and finished in the same manner as natural woods. Cellulosic/polymer composites also have better surface wear resistance than solid wood, especially in applications like flooring and decking where regular abrasion occurs. Consequently, cellulosic/polymer composites are commonly used for applications such as interior and exterior decorative house moldings, picture frames, furniture, porch decks, deck railings, window moldings, window components, door components; roofing structures, building siding and cladding, and other suitable indoor and outdoor components. Furthermore, cellulosic/polymer composites may replace highly durable and scarce hardwoods, e.g. tropical hardwoods.

Those skilled in the art have recognized that excessive moisture content in a synthetic wood composition may result in a poor quality end product. In particular, excessive moisture content in a synthetic wood composition may result in an end component that is susceptible to swelling, cracking, and crumbling appearance. Consequently, it may be necessary to dry cellulosic material to a predetermined level prior to introducing it into the synthetic wood composition. Even after the cellulosic material is dried, it has a natural tendency to reabsorb moisture from the environment. As a result, it may also be necessary to store the dried cellulosic material in a moisture controlled environment to prevent the cellulosic material from reabsorbing additional moisture before being added to the synthetic wood composition. In light of these considerations, it may be difficult and costly to maintain sufficiently dry cellulosic material while shipping it between different locations.

Plastic fence components have been developed as alternatives or supplements to traditional, natural wood fences. For example, U.S. Pat. No. 5,100,109 describes a method of constructing a fence by providing a flexible, plastic, rollable fence board that can be unrolled and fastened to spaced apart fence posts. The flexible fence board is made with height and width dimensions simulating a standard wooden board and with a length of 350 feet or more. According to this patent, the fence board is formed in a continuous extrusion process of a flexible thermoplastic material.

U.S. Pat. No. 5,404,685 describes a wall or fence made in part of foamed polystyrene plastic components, more specifically, plastic columns and panels. Construction of a fence in accordance with this patent requires multiple steps. For example, wall or fence stability is achieved by pouring a reinforcing filler material, such as concrete, into a hollow of the polystyrene plastic columns after the columns have been secured to the ground. A hardened outer surface of the fence is achieved by applying an exterior finish, such as stucco or special exterior paint, to the fence or wall after the fence has been constructed.

However, the synthetic wood or wood composite products described above, typically have disadvantages when their mechanical properties, especially when strength and stiffness are compared with the wood they replace. Further, the wood/cellulosic composites described above are susceptible to creep when subjected to continuous loads and/or high ambient temperatures. Additionally, these materials tend to warp after long term exposure to heat. Because of these structural limitations, the use of the synthetic wood products described above is often restricted to less structural applications. For example, in decks they are used for deck boards but typically cannot be used for the vertical posts and joists that bear the loads of the whole structure. However, compared to products made of thermoplastic polymers, which typically have a high coefficient of thermal expansion, wood/cellulosic composites generally have improved thermal stability. Pure thermoplastic polymers have a high level of thermal expansion. The introduction of lignocellulosic fiber to the polymer reduces the thermal expansion coefficient.

U.S. Pat. No. 8,221,663 describes a method of making foamed articles having a density of not more than 1.3 g/cm$^3$.

One problem related to methods for preparing polymer-wood compositions is to ensure that the conditions are such that articles with desired properties, such as thermoplastic weldability, can be achieved. In some embodiments, it is important to be able to obtain symmetrical articles having fine details and specific profiles and shapes. A further problem relates to ensuring that a sufficiently high proportion of cellulosic fiber can be used, yet resulting in an article with the desired properties.

Thus, there is a need in the art to provide composite materials and composite product that overcome the above-described problems, as well as methods of making such composite materials and composite products.

SUMMARY OF THE INVENTION

It is an objective of the present invention to provide a composite material comprising cellulosic fiber having improved properties, such as improved strength and stiffness properties as well as low creep.

Another object of the present invention is to provide a composite product comprising such a composite material.

These objectives and other advantages are achieved by the present invention.

The present invention is directed to a composite material comprising at least 20% by weight of a cellulosic material, at least 1% by weight and less than 20% by weight of styrene maleic anhydride and from 5% to 50% by weight of a high impact polystyrene. In one embodiment of the present invention, the composite material may comprise other fillers such as calcium carbonate and other inorganic fillers.

The cellulosic material may be thermally modified cellulosic material. The thermal modification is carried out by heat treatment, preferably at a temperature between 160-250° C., preferably between 200-230° C. at atmospheric pressure or at a temperature above 120° C. at an elevated pressure according to methods known in the art.

The composite material comprises at least 20% by weight of cellulosic material, preferably between 25-75% by weight and even more preferably between 40-65%, 45-65% or between 50-60% by weight of cellulosic material.

In one embodiment, the composite material comprises at least 2% and less than 20% by weight, such as from 2% to 15% by weight or from 2% to 10%, 5% to 10% or 2% to 7% by weight of styrene maleic anhydride (SMA).

The cellulosic material may consist of a single form of cellulosic material or for example a mixture of different types of fibers. The cellulosic material may for example be provided in the form of wood particles or pulp. Examples of pulp include mechanical pulp, semi-mechanical or chemical pulp, such as thermomechanical pulp, chemithermomechanical pulp or chemical pulp (manufactured in the kraft or sulfite process) or dissolving pulp. The wood particles may for example be ground wood, wood flour or sawdust. The cellulosic material may be compacted before being used to prepare the composite material according to the present invention.

The cellulosic material may have a particle size below 1 mm, preferably below 0.50 mm and even more preferably below 0.25 mm or below 0.1 mm. It is preferred that the cellulosic material has a small size since a more even dispersion and distribution of the cellulosic material in the composite material is achieved. If the cellulosic material is in the form of cellulosic fibers, the fibers preferably has a fiber length below 1 mm, preferably below 0.50 mm and even more preferably below 0.25 mm or below 0.1 mm.

The cellulosic material may be in the form of a powder. Thus, the cellulosic material may comprise cellulosic fibers that have been mechanically treated to produce a powder. The size of the cellulosic material is of importance to be able to obtain a composite material where the cellulosic material is evenly distributed. It has been found that if the cellulosic material is in the form of a powder it is easy to achieve a good dispersion and mixture with the polymer.

The high impact polystyrene (HIPS) can be for example a graft copolymer of wherein polybutadiene has been added during polymerization to become chemically bonded to the polystyrene and which has subsequently been mixed with normal polybutadiene. HIPS is commercially available, for example under the name Bextrene.

The SMA (styrene maleic anhydride) is a synthetic polymer that is built up of styrene and maleic anhydride monomers.

The present invention also relates to a process for producing a composite product which process comprises the steps of: providing a cellulosic material, high impact polystyrene (HIPS) and styrene maleic anhydride (SMA), feeding said cellulosic material, HIPS and SMA to an extruder and extruding the composite product.

The temperature used in the extruder is preferably above 180° C.

DETAILED DESCRIPTION

The present invention relates to a composite material comprising cellulosic material, high impact polystyrene (HIPS) and styrene maleic anhydride (SMA). It has surprisingly been found that the composite material according to the present invention provides enhanced strength and stiffness properties.

The process ability of the composite material according to the present invention is suitable for high strength composite profiles for applications such as windows and doors and heavier infrastructure applications where normal wood-polymer composites and plastics are not suitable.

The improved strength and stability observed is enhanced by an esterification reaction between the cellulosic material and matrix components. In one embodiment of the present invention, the gravimetric density of the composite material and composite product is higher than 1.0 g/cm$^3$, such as higher than 1.3 g/cm$^3$.

Furthermore, by using thermally modified cellulosic material in the composite, it has been found that a composite having particularly advantageous strength properties is achieved.

With thermally modified cellulosic material, it is meant that the cellulosic material has been thermally treated at an increased temperature between 160-250° C. at atmospheric pressure or at a temperature above 120° C. at an elevated pressure of above 1 bar. The cellulosic material can be thermally treated cellulosic fibers of any kind of cellulosic wood material. The thermally modified cellulosic fibers may be further treated to form said thermally modified cellulosic material, e.g. mechanically treated and/or chemically treated. The mechanical treatment of the thermally treated cellulosic fibers may be done to form a powder and one of the advantages with mechanically treating thermally modified cellulosic fibers are that they easily break into very small particles with unique shape. Size and shape are key parameters influencing numerous composite properties, such as strength and water uptake. Because of the very fine particle size and lack of resin compared to what is found in normal dried wood the risk of fiber bundling is greatly reduced when adding the thermally modified cellulosic material to the polymer to form the composite material, which in turn leads to more even dispersion and distribution. Chemical treatment of the thermally treated cellulosic fibers may be done to improve the reactivity of the material. It may also be possible to thermally treat cellulosic fibers that have been mechanically or chemically treated, e.g. to thermally treat cellulosic fiber that have been ground into a powder.

The composite material may also comprise additives that will enhance the performance and process parameters of the composite. Possible additives may be lubricants, coupling agents, pigments, uv-stabilizers or blockers and/or fillers. In one embodiment of the present invention, the composite material comprises a flame retardant.

The present invention also relates to a process for producing a composite product which process comprises using an extruder to manufacture the composite product. It is possible to use any kind of extruder.

The composite material according to the present invention may for example be produced in the form of pellets or granules, using a compounding extruder. Such pellets or granules can be used to manufacture a composite product comprising the composite material. Such composite products can for example be manufactured by extrusion, injection moulding, rota moulding, 3D printing or form pressing. The composite material may also be produced in the form of a shaped composite product, for example by providing a profile die through which a shaped composite product is extruded. Such profiled composite products may be produced in variety of shapes and for multiple purposes.

The produced composite product can be used for the production of many different products, such as cladding, decking, window and door profiles, light poles, jetties, joinery, furniture etc. The produced composite products may be used for applications such as interior and exterior decorative house moldings, picture frames, furniture, porch decks, deck railings, window moldings, window components, door components, roofing structures, building siding and cladding, and other suitable indoor and outdoor components. The composite material and composite products according to the present invention may also be useful in shoring as well as in marine environments such as submerged structures. Furthermore, cellulosic/polymer composites according to the present invention may replace highly durable and scarce hardwood, e.g. tropical hardwood.

EXAMPLES

Abbreviations:
SMA: styrene maleic anhydride (Xiran from Polyscope)
TW: thermally modified cellulosic material
HIPS: high impact polystyrene
MOE: modulus of elasticity
STD: standard deviation
WPC: wood-polymer composite
Avg: average
COV: coefficient of variance

Example 1

In this experiment, the mechanical properties of composite products comprising a composite material according to the present invention were investigated.

Thermally modified wood (HTW) fibers were used. The fibers were shavings from pine that had been thermally modified by heating to 212° C. for 3 hours and subsequently ground in a hammer mill and passed through a screen.

The following formulations where prepared:

TABLE 1

| Formulations of samples, % by weight. | | | |
| --- | --- | --- | --- |
| Sample | Content of cellulosic material | SMA content | HIPS content |
| Control-pine | Pine 50% | 0% | 50% |
| SMA-0% | TW 50% | 0% | 50% |
| SMA-2.5% | TW 50% | 2.5% | 47.5% |
| SMA-5.0% | TW 50% | 5.0% | 45.0% |
| SMA-7.5% | TW 50% | 7.5% | 42.5% |
| SMA-10.0% | TW 50% | 10.0% | 40.0% |
| SMA-12.5% | TW 50% | 12.5% | 37.5% |
| SMA-15.0% | TW 50% | 15.0% | 35.0% |

The specifications of the pilot extrusion system were as follows: with the following process parameters used in the extruder:

TABLE 2

| Extrusion parameters, Woodtruder equipment. The cellulosic fibers were direct fed to the twin screw and the SMA was added via the single screw. Decking board composite products were produced. | | | | | | | | | | | | | | |
| --- | --- | --- | --- | --- | --- | --- | --- | --- | --- | --- | --- | --- | --- | --- |
| Die part | | | | WT 94 Twin-screw extruder | | | | | | | | | | |
| Die 3 | Die 2 | Die 1 | Clamp | Zone8 | Zone7 | Zone6 | Zone5 | Zone4 | Zone3 | Zone2 | Zone1 | RPM | Melt P. | Melt T. |
| 200 | 200 | 200 | 210 | 200 | 190 | 190 | 185 | 180 | 180 | 170 | 165 | 37 | psi | 193 |

TABLE 2-continued

Extrusion parameters, Woodtruder equipment. The cellulosic fibers were direct fed to the twin screw and the SMA was added via the single screw. Decking board composite products were produced.

| Output rate | Vacuum | T75 Single-screw extruder | | | | | | | | |
|---|---|---|---|---|---|---|---|---|---|---|
| Lbs/hr | inches Hg | Clamp | Adapt | Zone5 | Zone4 | Zone3 | Zone2 | Zone1 | RPM | Melt P. | Melt T. |
| 72~75 | 30 inch | 210 | 210 | 210 | 200 | 195 | 190 | 185 | 17 | psi | 205 |

The flexural properties (flexural strength and flexural modulus) were determined for the samples:

TABLE 3

Flexural properties of samples and control/comparative samples.

| | Strength | | MOE | |
|---|---|---|---|---|
| Sample | Average, MPa | STD | Average, MPa | STD |
| Control-pine | 31.07 | 1.36 | 4688 | 425 |
| SMA-0% | 31.26 | 1.17 | 5849 | 170 |
| SMA-2.5% | 45.71 | 3.26 | 6888 | 268 |
| SMA-5% | 49.82 | 1.80 | 6865 | 237 |
| SMA-7.5% | 50.26 | 1.80 | 6431 | 237 |
| SMA-10% | 50.29 | 1.99 | 6110 | 328 |
| SMA-12.5% | 49.85 | 2.86 | 5660 | 083 |
| SMA-15% | 49.01 | 2.14 | 5531 | 117 |
| Foamed SMA-WPC* | 24.82 | — | 3534 | — |
| Commercially available WPC** | 19.99 | — | 1379 | — |

*data from decking board samples made of NovaChem SMA and pine wood; wood content 30% and specific gravity was 0.85
**commercially available product (polypropylene/polyethylene and 50% by weight of normal sawdust); data from technical data sheet of commercially available WPC Example 2

The dimensional stability of the samples was determined.

The samples were first conditioned at room temperature and then immersed into water for a total of 28 days. The dimensional measurements were conducted at 24 hours. 7 days, 14 days, 21 days and 28 days for the water absorption and dimensional changes of width, length and thickness.

TABLE 4

Weight gain percentage of the samples soaked in water.

| | 24 hours | | 7 days | | 14 days | | 21 days | | 28 days | |
|---|---|---|---|---|---|---|---|---|---|---|
| Sample | Avg | COV | Avg | COV | Avg | COV | Avg | COV | Avg | COV |
| SMA 0% | 0.085 | 4.47 | 0.525 | 2.38 | 0.822 | 2.16 | 1.131 | 3.54 | 1.222 | 3.07 |
| SMA 2.5% | 0.056 | 33.81 | 0.472 | 25.59 | 0.705 | 18.27 | 0.936 | 15.67 | 0.991 | 10.6 |
| SMA 5% | 0.049 | 36.39 | 0.381 | 16.89 | 0.613 | 13.91 | 0.817 | 3.35 | 0.884 | 9.62 |
| SMA 7.5% | 0.044 | 6.57 | 0.336 | 3.13 | 0.567 | 3.28 | 0.793 | 3.05 | 0.847 | 3.01 |
| SMA 10% | 0.051 | 11.07 | 0.363 | 8.16 | 0.568 | 8.71 | 0.799 | 6.12 | 0.884 | 7.23 |
| SMA 12.5% | 0.055 | 12.77 | 0.363 | 3.47 | 0.572 | 2.68 | 0.811 | 2.27 | 0.886 | 1.62 |
| SMA 15% | 0.058 | 8.70 | 0.355 | 1.63 | 0.603 | 2.09 | 0.818 | 1.83 | 0.888 | 1.08 |
| Control-pine | 0.300 | 13.39 | 1.385 | 8.59 | 2.028 | 7.80 | 2.646 | 7.49 | 2.817 | 7.61 |

TABLE 5

Dimensional change (thickness swelling), percentage, samples soaked in water.

| | 24 hours | | 7 days | | 14 days | |
|---|---|---|---|---|---|---|
| Sample | Avg | COV | Avg | COV | Avg | COV |
| SMA 0% | 0.510 | 12.420 | 0.742 | 15.270 | 0.888 | 2.080 |
| SMA 2.5% | 0.474 | 19.440 | 0.612 | 17.780 | 0.668 | 15.610 |
| SMA 5% | 0.523 | 9.750 | 0.650 | 13.840 | 0.706 | 12.110 |
| SMA 7.5% | 0.531 | 8.470 | 0.617 | 9.440 | 0.690 | 9.740 |
| SMA 10% | 0.479 | 17.580 | 0.563 | 18.340 | 0.650 | 14.190 |
| SMA 12.5% | 0.420 | 18.240 | 0.540 | 9.840 | 0.612 | 7.820 |
| SMA 15% | 0.392 | 10.300 | 0.532 | 8.750 | 0.616 | 8.410 |
| Control-pine | 1.011 | 6.460 | 1.518 | 6.550 | 1.836 | 6.680 |

| | 21 days | | 28 days | |
|---|---|---|---|---|
| Sample | Avg | COV | Avg | COV |
| SMA 0% | 0.955 | 9.050 | 1.041 | 6.86 |
| SMA 2.5% | 0.685 | 16.800 | 0.769 | 21.43 |
| SMA 5% | 0.770 | 13.680 | 0.809 | 13.13 |
| SMA 7.5% | 0.748 | 10.750 | 0.750 | 10.63 |
| SMA 10% | 0.712 | 12.770 | 0.768 | 13.62 |
| SMA 12.5% | 0.689 | 8.090 | 0.730 | 7.31 |
| SMA 15% | 0.680 | 9.500 | 0.728 | 7.38 |
| Control-pine | 2.150 | 8.440 | 2.245 | 8.23 |

It was found that the samples with thermally modified cellulosic material had less water absorption (weight gain) and dimensional changes compared to the sample made with regular pine.

The content of SMA significantly affected the water absorption (weight gain) and dimensional changes of the sample.

Example 3

The coefficient of thermal expansion (GTE) was determined in accordance with ASTM Standard D 696 and compared to other conventional plastic and composite products. The GTE is measured for two directions, lengthwise (extrusion direction) and widthwise (cross direction to the extrusion).

TABLE 6

CTE values of the samples

| Sample | CTE Avg | STD | COV |
|---|---|---|---|
| Control-pine-length | 2.76E−05 | 5.16E−06 | 18.71 |
| Control-pine-width | 6.96E−05 | 2.23E−07 | 0.32 |
| SMA-0%-length | 4.86E−05 | 3.65E−06 | 7.51 |
| SMA-0%-width | 6.94E−05 | 3.07E−06 | 4.42 |
| SMA-2.5%-length | 2.40E−05 | 2.13E−06 | 8.88 |
| SMA-2.5%-width | 6.62E−05 | 2.16E−06 | 3.26 |
| SMA-5.0%-length | 2.51E−05 | 2.61E−06 | 10.42 |
| SMA-5.0%-width | 6.68E−05 | 7.61E−07 | 1.14 |
| SMA-7.5%-length | 2.30E−05 | 9.67E−08 | 0.42 |
| SMA-7.5%-width | 6.65E−05 | 1.32E−06 | 1.98 |
| SMA-10%-length | 2.29E−05 | 5.74E−07 | 2.51 |
| SMA-10%-width | 6.72E−05 | 4.77E−07 | 0.71 |
| SMA-12.5%-length | 2.02E−05 | 2.16E−06 | 1.07 |
| SMA-12.5%-width | 6.47E−05 | 1.15E−06 | 1.77 |
| SMA-15%-length | 2.07E−05 | 1.75E−06 | 8.47 |
| SMA-15%-width | 6.46E−05 | 3.48E−06 | 5.39 |
| PVC profile* | 5.0E−05 | | |
| Commercially available WPC** | 2.0E−05 | | |

*the CTE value of the PVC profiles is assumed being lengthwise expansion unless the manufacturers mention the expansion direction.
**the CTE value of a commercially available WPC is assumed to be lengthwise expansion It was found that the samples according to the present invention showed coefficient of thermal expansion similar to commercially available WPC and about 50% of a PVC profile which is a major advantage.

It was found that the CTE for extrusion (lengthwise) direction is much less than cross (widthwise) direction.

It was found that the samples with thermally modified cellulosic material showed lower CTE values than with the normal pine.

It was found that the content of SMA contributed to lower CTE of the samples.

Example 4

A study was carried out to estimate the feasibility of painting on the surfaces of composite products according to the present invention.

The following samples were prepared (weight-%):

| Sample | Description | Note |
|---|---|---|
| HIPS-TW-WPC-SMA 2.5% | HIPS 47.5% with TW 50%/SMA 2.5% | Cut from decking boards |
| HIPS-TW-WPC-SMA 5.0% | HIPS 45% with TW 50%/SMA 5.0% | Cut from decking boards |
| HIPS-TW-WPC-SMA 10% | HIPS 40% with TW 50%/SMA 10% | Cut from decking boards |
| HIPS-TW-WPC-SMA 15% | HIPS 35% with TW 50%/SMA 15% | Cut from decking boards |

SMA: styrene maleic anhydride (Xiran from Polyscope)
TW: thermally modified cellulosic material (*)
HIPS: high impact polystyrene
(*)_The fibers were shavings from pine that had been thermally modified by heating to 212° C. for 3 hours and subsequently ground in a hammer mill and passed through a screen.

The painting/coating conditions were as follows:

| | |
|---|---|
| Paint brand | NuCoat water-based |
| Paint product name | Super anti-heat Signal Black & Bar Red |
| Surface preparation | Scrubbed with Scotch Brite and wiped down with Zowo-Plast 1120 or used as supplied |
| Spray rate | Spray booth 75° with 1.8 nozzle size |
| Spray pressure | 55 psi |
| Room condition | Room temperature under RH 39% |
| Cure temperature | 90.5° F. with RH 21% |
| Cure time | 24 hours |

Test method: ASTM D4541, Standard test method for pull-off strength of coatings using portable adhesion testers, was used. The portable adhesion tester was a pull-off tester, Model PosiTest AT-M from DeFelsko.

The following results were obtained:

| Sample | Average pull-off stress |
|---|---|
| HIPS-TW-WPC-SMA 2.5% | 237 psi |
| HIPS-TW-WPC-SMA 5.0% | 312 psi |
| HIPS-TW-WPC-SMA 10% | 335 psi |
| HIPS-TW-WPC-SMA 15% | 373 psi |

The pull-off test was conducted on the hard surfaces with and without treatment to evaluate the topological properties of the sample surfaces. The surface treatment was conducted by scrubbing the surface using Scotch Brite® sponges and wiped down with Zowo-Plast 1120, a water-based/biodegradable cleaning agent for cleaning and preparing prior to coating.

The following results were obtained for the treated surfaces:

| Sample | Average pull-off stress |
|---|---|
| HIPS-TW-WPC-SMA 2.5% | 555 psi |
| HIPS-TW-WPC-SMA 5.0% | 463 psi |
| HIPS-TW-WPC-SMA 10% | 677 psi |
| HIPS-TW-WPC-SMA 15% | 646 psi |

The pull-off stress of all samples are very high which represents the painting-ability of the composite products according to the present invention. As shown above, the SMA content and the surface treatment affect the bonding strength.

In view of the above detailed description of the present invention, other modifications and variations will become apparent to those skilled in the art. However, it should be apparent that such other modifications and variations may be effected without departing from the spirit and scope of the invention.

The invention claimed is:
1. A composite material comprising:
at least 20% by weight of a cellulosic material,
at least 1% by weight and less than 20% by weight of styrene maleic anhydride, and
from 5% to 50% by weight of a high impact polystyrene,
wherein the cellulosic material is a thermally modified cellulose material, and
wherein the cellulosic material has been thermally modified by heat treatment either at a temperature between 160-250° C. at atmospheric pressure or at a temperature above 120° C. at an elevated pressure.
2. The composite material according to claim 1, wherein the composite material comprises from 2% to 15% by weight of styrene maleic anhydride.

3. The composite material according to claim 2, wherein the composite material comprises from 5% to 10% by weight of styrene maleic anhydride.

4. The composite material according to claim 1, comprising 25-75% by weight of a cellulosic material.

5. The composite material according to claim 4, comprising 40-65% by weight of a cellulosic material.

6. The composite material according to claim 5, comprising 45-65% by weight of a cellulosic material.

7. The composite material according to claim 6, comprising 50-60% by weight of a cellulosic material.

8. The composite material according to claim 1, comprising 35-50% by weight high impact polystyrene.

9. The composite material according to claim 1, wherein the cellulosic material has a particle size below 1 mm.

10. The composite material according to claim 1, wherein the cellulosic material is in the form of a powder.

11. A composite product comprising a composite material according to claim 1.

12. A process for producing a composite product which process comprises the steps of:

a) providing a cellulosic material, high impact polystyrene (HIPS) and styrene maleic anhydride (SMA), wherein the cellulosic material is a thermally modified cellulose material, and wherein the cellulosic material has been thermally modified by heat treatment at a temperature between 160-250° C. at atmospheric pressure or at a temperature above 120° C. at elevated pressure;

b) feeding said cellulosic material, HIPS and SMA to an extruder; and c) extruding the composite product.

13. The composite material according to claim 1 wherein the cellulosic material has been thermally modified by heat treatment at a temperature between 200-230° C. at atmospheric pressure.

14. The composite material according to claim 1 wherein the cellulosic material has been thermally modified by heat treatment at a temperature above 120° C. at an elevated pressure.

* * * * *